(12) United States Patent
Karri et al.

(10) Patent No.: US 11,645,999 B2
(45) Date of Patent: May 9, 2023

(54) DYNAMIC ALIGNMENT OF MOBILE DEVICE CONTENT

(71) Applicant: INTERNATIONAL BUSINESS MACHINES CORPORATION, Armonk, NY (US)

(72) Inventors: Venkata Vara Prasad Karri, Visakhapatnam (IN); Sarbajit K. Rakshit, Kolkata (IN); Kamal Kiran Trood Yamala, Visakhapatnam (IN); Swamy Subramanya, Visakhapatnam (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/405,489

(22) Filed: Aug. 18, 2021

(65) Prior Publication Data
US 2023/0056305 A1  Feb. 23, 2023

(51) Int. Cl.
| H04W 4/02 | (2018.01) |
| G03H 1/22 | (2006.01) |
| G09G 5/30 | (2006.01) |
| G09G 5/32 | (2006.01) |
| H04M 1/02 | (2006.01) |

(52) U.S. Cl.
CPC ............... *G09G 5/30* (2013.01); *G09G 5/32* (2013.01); *H04W 4/023* (2013.01); *G03H 1/22* (2013.01); *G09G 2320/028* (2013.01); *G09G 2320/066* (2013.01); *G09G 2320/068* (2013.01); *G09G 2320/0626* (2013.01); *G09G 2340/145* (2013.01); *G09G 2356/00* (2013.01); *G09G 2358/00* (2013.01); *H04M 1/0202* (2013.01)

(58) Field of Classification Search
None
See application file for complete search history.

(56) References Cited

U.S. PATENT DOCUMENTS

| 9,740,284 B2 | 8/2017 | Sullivan |
| 10,082,863 B2 | 9/2018 | Kempinski |
| 10,664,047 B2 | 5/2020 | Rakshit |

(Continued)

OTHER PUBLICATIONS

Strack, Effortlessly Improve Your Posture at Office or at Home, Amazon.com, Retrieved from Internet Aug. 18, 2021, 4 Pages.

(Continued)

*Primary Examiner* — Joni Hsu
(74) *Attorney, Agent, or Firm* — Robert R. Aragona

(57) ABSTRACT

An embodiment for adjusting digital content in a flexible display device is provided. The embodiment may include receiving data relating to a position and orientation of a reference device relative to a user. The embodiment may also include identifying an orientation of a display surface of a mobile device and a relative position of the mobile device relative to a viewing direction of the user. The embodiment may further include identifying an optimal viewing angle of display content on the display surface of the mobile device. The embodiment may also include in response to determining the display content is not able to be displayed as a hologram, aligning the display content as text based on the optimal viewing angle. The embodiment may further include presenting the aligned display content as text to the user.

17 Claims, 7 Drawing Sheets

(56) References Cited

U.S. PATENT DOCUMENTS

| 10,694,017 | B2 | 6/2020 | Boss | |
|---|---|---|---|---|
| 2011/0002019 | A1* | 1/2011 | Routley | H04N 9/3111 |
| | | | | 353/38 |
| 2015/0116364 | A1* | 4/2015 | Aurongzeb | G06F 1/1649 |
| | | | | 345/659 |
| 2015/0143234 | A1 | 5/2015 | Norris, III | |
| 2018/0188536 | A1* | 7/2018 | Bell | G02B 5/23 |
| 2018/0285052 | A1* | 10/2018 | Eade | B65G 1/0492 |
| 2019/0317974 | A1* | 10/2019 | Chamberlin | G06F 16/29 |
| 2020/0334393 | A1* | 10/2020 | Wodrich | G06F 30/13 |

OTHER PUBLICATIONS

Disclosed Anonymously, "Cognitive Data User Directed Gaze Based Screen Interface Augmentation" P.com No. IPCOM000262174D, IP.com Electronic Publication Date: May 8, 2020, 6 Pages.

Disclosed Anonymously, "Method and System for Midair Projected Content Arrangement Based on User's Cognitive Ergonomics", IP.com: IPCOM000256342D: Nov. 20, 2018, 4 Pages.

Mell et al., "The NIST Definition of Cloud Computing", Recommendations of the National Institute of Standards and Technology, NIST Special Publication 800-145, Sep. 2011, 7 pages.

\* cited by examiner

DYNAMIC ALIGNMENT OF MOBILE DEVICE CONTENT

BACKGROUND

The present invention relates generally to the field of computing, and more particularly to a system for dynamically aligning content displayed on a mobile device based on an orientation of a display surface of the device relative to a viewing direction of a user.

Smartphones and other mobile devices enable people to communicate with each other over long and short distances in real-time. These mobile devices have a wide range of capabilities, including making phone calls, sending and receiving emails and instant messages, as well as browsing the web and playing videos. In fact, many mobile devices have the same or increased capability over their desktop and laptop counterparts. Some of these mobile devices are even flexible, allowing a user to fold, bend, stretch, and/or roll the mobile device, adding to their portability. As technology continues to improve and as society becomes more Internet-centric, the demand for mobile devices is expected to increase in the coming years.

SUMMARY

According to one embodiment, a method, computer system, and computer program product for adjusting digital content in a flexible display device is provided. The embodiment may include receiving data relating to a position and orientation of a reference device relative to a user. The embodiment may also include identifying an orientation of a display surface of a mobile device and a relative position of the mobile device relative to a viewing direction of the user based on the position and orientation of the reference device. The embodiment may further include identifying an optimal viewing angle of display content on the display surface of the mobile device based on the orientation of the display surface and the position of the mobile device relative to the viewing direction of the user. The embodiment may also include in response to determining the display content is not able to be displayed as a hologram, aligning the display content as text based on the optimal viewing angle. The embodiment may further include presenting the aligned display content as text to the user.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
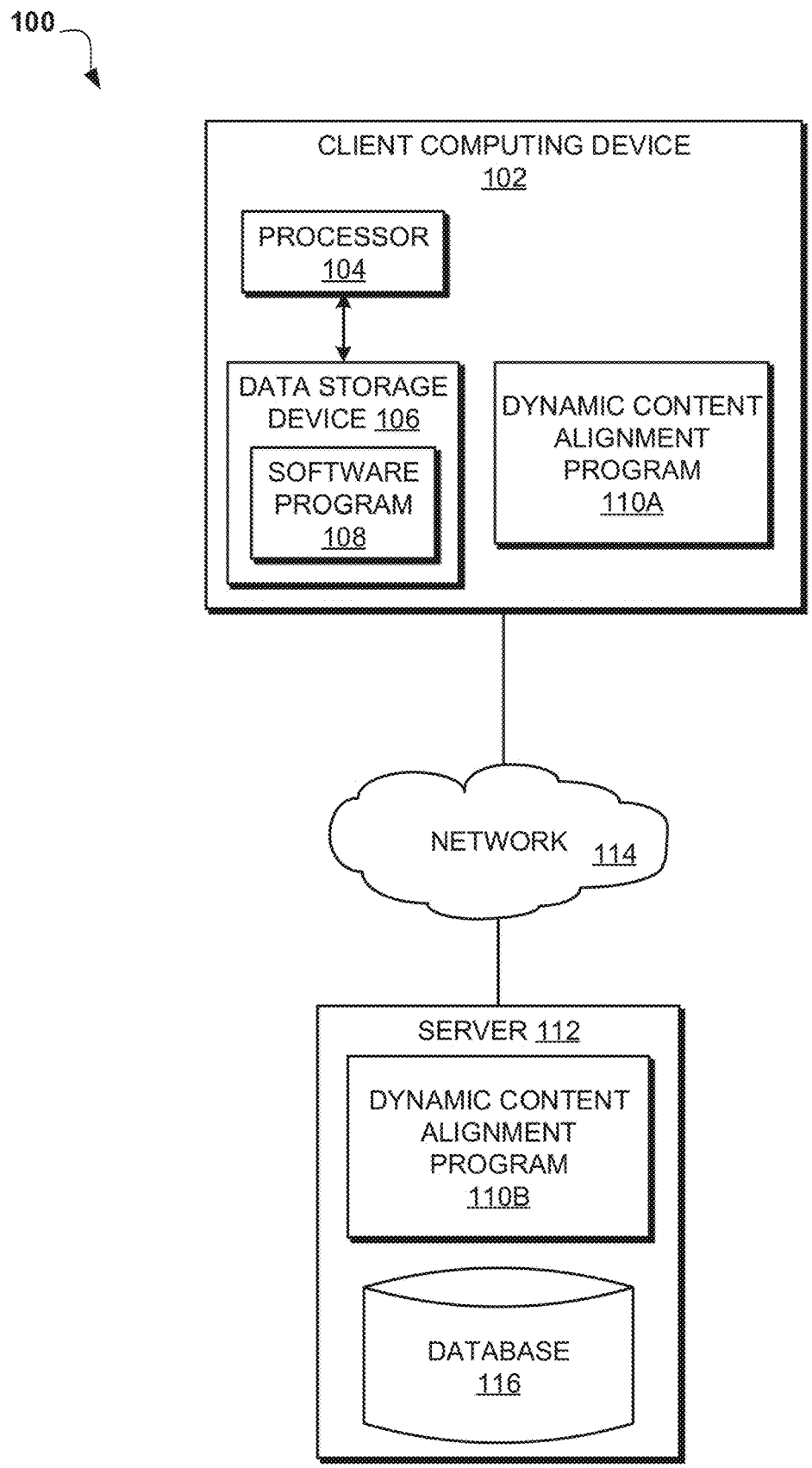
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to a system for dynamically aligning content displayed on a mobile device based on an orientation of a display surface of the device relative to a viewing direction of a user. The following described exemplary embodiments provide a system, method, and program product to, among other things, identify an optimal viewing angle of content displayed on a display surface of a mobile device based on an orientation of the display surface and a position of the mobile device relative to a viewing direction of the user and, accordingly, align the display content as text and/or a hologram based on the optimal viewing angle. Therefore, the present embodiment has the capacity to improve mobile device technology by preventing the distortion of displayed content and allowing for better readability when the mobile device is viewed from various angles.

As previously described, smartphones and other mobile devices enable people to communicate with each other over long and short distances in real-time. These mobile devices have a wide range of capabilities, including making phone calls, sending and receiving emails and instant messages, as well as browsing the web and playing videos. In fact, many mobile devices have the same or increased capability over their desktop and laptop counterparts. Some of these mobile devices are even flexible, allowing a user to fold, bend, stretch, and/or roll the mobile device, adding to their portability. As technology continues to improve and as society becomes more Internet-centric, the demand for mobile devices is expected to increase in the coming years. If the mobile device is resting on a surface, such as a table or chair, and the user is not looking directly at the mobile device (i.e., a viewing angle that is not 0°), the display of content on a display surface of the mobile device may be distorted. For example, the user who is viewing content on the mobile device may not be able to properly view the content when the orientation of the mobile device is at a sharp angle from the viewing direction of the user. This problem is typically addressed by recommending to the user a better orientation of the mobile device if a current orientation of the mobile device does not allow for the best viewing of displayed content. However, recommending a better orientation of the mobile device fails to automatically align the display content and requires the user to manually change the orientation of the mobile device. It may therefore be imperative to have a system in place to dynamically and automatically align display content on a mobile device relative to a viewing direction of a user. Thus, embodiments of the present invention may provide advantages including, but not limited to, automatically aligning display content on a mobile device relative to a viewing direction of a user, enabling a user to view display content clearly regardless of the orientation of a mobile device, and displaying content as a hologram for better readability. The present invention does not require that all advantages need to be incorporated into every embodiment of the invention.

According to at least one embodiment, when a user is viewing content on a mobile device, data relating to a position and orientation of a reference device relative to a user may be received in order to identify an orientation of a display surface of a mobile device and a relative position of the mobile device relative to a viewing direction of the user. For example, the display surface of the mobile device may be oriented at an angle of 45° from the viewing direction of the user, explained in further detail below with respect to FIGS. 2-4. Upon identifying the orientation of the display surface of the mobile device and the relative position of the mobile device, an optimal viewing angle of display content on the display surface of the mobile device may be identified. According to at least one embodiment, in response to determining the display content is not able to be displayed as a hologram, the display content may be aligned as text based on the optimal viewing angle in order to present the aligned display content as text to the user. According to at least one other embodiment, in response to determining the display content is able to be displayed as a hologram and the display content is not able to fit within the display surface, the display content may be aligned as text and a hologram based on the optimal viewing angle in order to present the aligned display content as text and the hologram to the user.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to identify an optimal viewing angle of content displayed on a display surface of a mobile device based on an orientation of the display surface and a position of the mobile device relative to a viewing direction of the user and, accordingly, align the display content as text and/or a hologram based on the optimal viewing angle.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a dynamic content alignment program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 5, the client computing device 102 may include internal components 502a and external components 504a, respectively.

The server computer 112 may be a laptop computer, netbook computer, personal computer (PC), a desktop computer, or any programmable electronic device or any network of programmable electronic devices capable of hosting and running a dynamic content alignment program 110B and a database 116 and communicating with the client computing device 102 via the communication network 114, in accordance with embodiments of the invention. As will be discussed with reference to FIG. 5, the server computer 112 may include internal components 502b and external components 504b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the dynamic content alignment program 110A, 110B may be a program capable of receiving data relating to a position and orientation of a reference device relative to a user, identifying an optimal viewing angle of content displayed on a display surface of a mobile device based on an orientation of a display surface and a position of the mobile device relative to a viewing direction of the user, aligning the display content as text and/or a hologram based on the optimal viewing angle, automatically aligning display content on the mobile device relative to the viewing direction of the user, enabling the user to view display content clearly regardless of the orientation of the mobile device, and displaying content as a hologram for better readability. The dynamic content alignment method is explained in further detail below with respect to FIG. 2.

Figure 2:
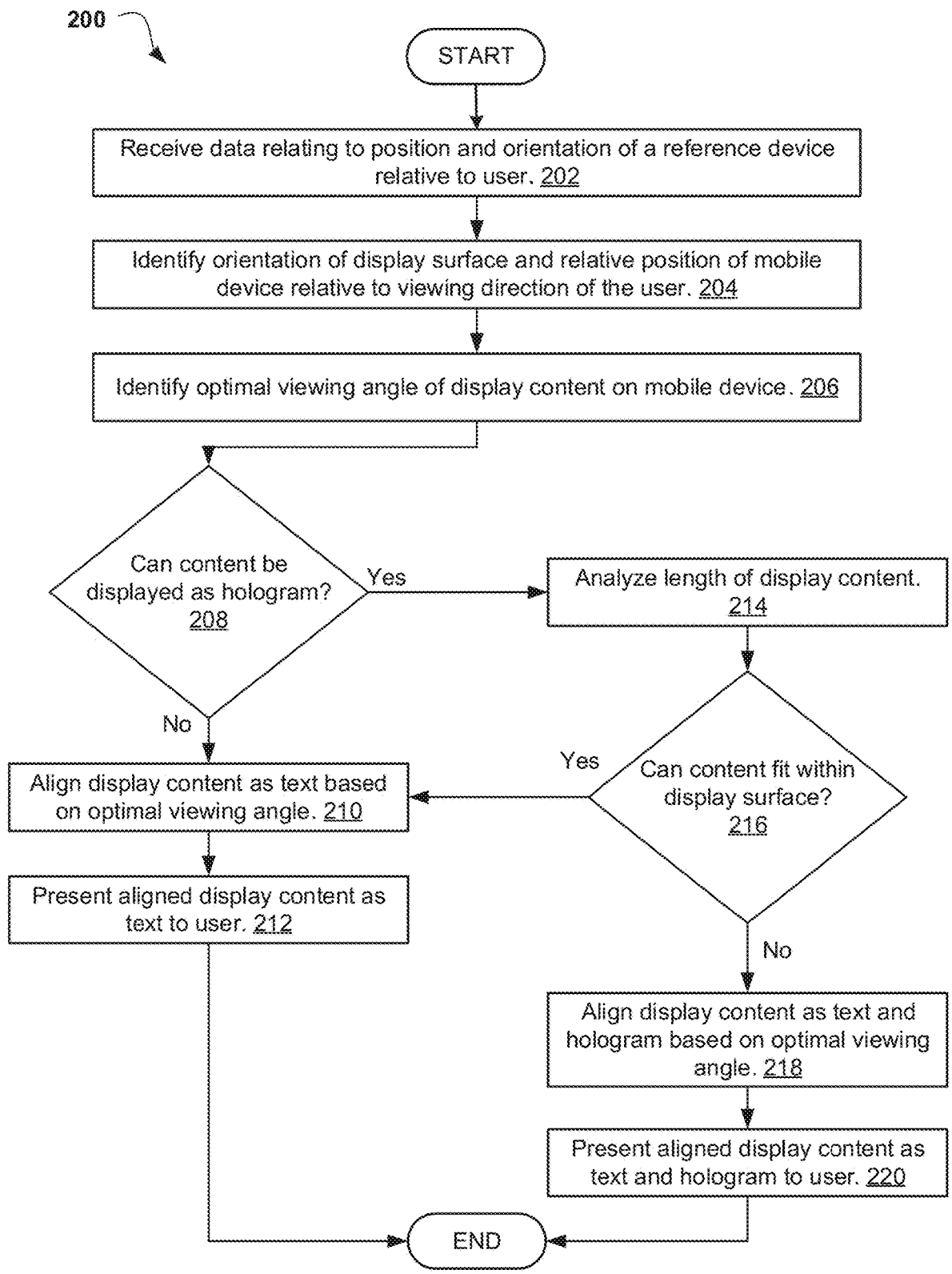
FIG. 2 illustrates an operational flowchart for dynamically aligning content displayed on a mobile device based on an orientation of a display surface of the device relative to a viewing direction of a user in a dynamic content alignment process according to at least one embodiment.

Referring now to FIG. 2, an operational flowchart for dynamically aligning content displayed on a mobile device based on an orientation of a display surface of the device relative to a viewing direction of a user in a dynamic content alignment process 200 is depicted according to at least one embodiment. At 202, the dynamic content alignment program 110A, 110B receives the data relating to the position and orientation of the reference device relative to the user. In embodiments of the present invention, the reference device may be a laptop computer or a desktop computer. The position and orientation of the reference device relative to the user may, for example, be identified from thermal, ultrasound, acoustic, and/or infrared sensors embedded in either the reference device or the mobile device. For example, when typing on a laptop, the user may be looking directly at the laptop, with the mobile device on a left or right side of the laptop, described in further detail below with respect to FIG. 3. The reference device may also be used to determine the type of mobile device being used by the user. For example, the type of mobile device may be a smartphone, tablet, and/or a wireless display.

Then, at 204, the dynamic content alignment program 110A, 110B identifies the orientation of the display surface of the mobile device and the relative position of the mobile device relative to the viewing direction of the user. The orientation and relative position of the mobile device may be identified based on the position and orientation of the reference device. As described above, the mobile device may be on a left or right side of the reference device, if the mobile device is resting on a surface. Alternatively, the user may be holding the mobile device in their hand, in which case the orientation of the mobile device may change more frequently. Using a plurality of proximity and sonic wave sensors embedded in the mobile device, the dynamic content alignment program 110A, 110B may identify the orientation of the display surface of the mobile device and the relative position of the mobile device with respect to the reference device.

Since the position and orientation of the reference device are identified relative to the user (i.e., a viewing direction of the user), the orientation of the display surface of the mobile device and the relative position of the mobile device may also be identified relative to the viewing direction of the user. For example, the reference device and the mobile device may communicate with each other over a network or using Bluetooth® (Bluetooth and all Blurtooth-based trademarks and logos are trademarks or registered trademarks of Bluetooth SIG, Inc. and/or its affiliates) technology. The sensors in mobile device may determine how the mobile device is placed with respect to the user. For example, the mobile device may be placed on a left side of the user (i.e., to the left of the reference device), or the mobile device may be placed on a right side of the user (i.e., to the right of the reference device). The dynamic content alignment program 110A, 110B may historically gather data on where the mobile device is placed and how the user changes the orientation of the display surface of the mobile device. This data may be stored in a database, such as database 116.

The sensors may also determine an angle between the reference device and the display surface of the mobile device, described in further detail below with respect to FIG. 3. In some embodiments, a sensor may be used in conjunction with the sensors to determine the angle between the reference device and the display surface of the mobile device. For example, the mobile device may be on a right side of the reference device with the display surface of the mobile device parallel to the keyboard of the reference device. In this example, the orientation of the display surface of the mobile device is 0° from the viewing direction of the user. In another example, the mobile device may be on a right side of the reference device with the display surface of the mobile device at a 45° angle toward the keyboard of the reference device. Since in some embodiments of the present invention it may be assumed the user is looking at the reference device at a 0° angle, it may be determined, in this example, the orientation of the display surface of the mobile device is 45° toward the viewing direction of the user.

The sensors may also be used to determine a distance of the mobile device from the user. For example, the user may be sitting in a chair and the reference device and the mobile device may be sitting on a desk in front of the user. The mobile device may be adjacent to the reference device, in which case the distance between the user and the reference device and the distance between the user and the mobile device would be the same. In another example, the mobile device may be placed closer to the user on the desk, in which case the distance between the user and the reference device is farther than the distance between the user and the mobile device.

Next, at 206, the dynamic content alignment program 110A, 110B identifies the optimal viewing angle of display content on the display surface of the mobile device. The optimal viewing angle is based on the orientation of the display surface and the position of the mobile device relative to the viewing direction of the user. In this manner, display content may be displayed diagonally on the display surface of the mobile device. For example, the display content may be displayed along a diagonal line from a top left corner of the mobile device to a bottom right corner of the mobile device, described in further detail below with respect to FIG. 4.

In embodiments where the mobile device is resting on a physical surface, the mobile device may be placed by the user onto the surface in various orientations from the reference device, and therefore various orientations from the viewing direction of the user. Several examples will now be presented as to how the optimal viewing angle of the display content is identified for different orientations. The following example assume the mobile device is positioned to the right of the reference device, as shown in FIG. 3.

For example, the display surface of the mobile device may be at a 45° angle toward the keyboard of the reference device, and thus 45° from the viewing direction of the user. As used herein, "toward" means a top surface of the mobile device is closer to the reference device than the bottom surface of the mobile device, as shown in FIG. 3. In this example, the optimal viewing angle of the display content may be 45° from the viewing direction of the user along a diagonal line from a top left corner of the mobile device to a bottom right corner of the mobile device. In another example, the display surface of the mobile device may be at a 90° angle (i.e., perpendicular) toward the keyboard of the reference device, and thus 90° from the viewing direction of the user. In this example, the optimal viewing angle may be 45° from the viewing direction of the user along a diagonal line from a top right corner of the mobile device to a bottom left corner of the mobile device. In yet another example, the display surface of the mobile device may be at a 45° angle away from the keyboard of the reference device, and thus 45° from the viewing direction of the user. In this example, the optimal viewing angle may be 45° from the viewing direction of the user along a diagonal line from a bottom left corner of the mobile device to a top right corner of the mobile device. These examples are not intended to be limiting and one of ordinary skill in the art may identify other optimal angles for the display content which allow for better readability.

In embodiments where the mobile device is being held by the user, the mobile device may be gripped in various orientations relative to the reference device, and therefore various orientations from the viewing direction of the user. Several examples will now be presented as to how the optimal viewing angle of the display content is identified for different gripping orientations.

For example, the user may be holding the mobile device such that the display surface of the mobile device is directly in line with a display surface of the reference device. In this example, the optimal viewing angle may be how display content normally appears on a mobile device (i.e., in a horizontal or vertical direction). Thus, in this example, there may be no need to angularly align the display content. In another example, the user may be holding the mobile device such that a top surface of the mobile device is tilted at a 45° angle toward the keyboard of the reference device, and thus 45° from the viewing direction of the user. In this example, the optimal viewing angle may be 45° from the viewing direction of the user along a diagonal line from a top left corner of the mobile device to a bottom right corner of the mobile device. These examples are not intended to be limiting and one of ordinary skill in the art may identify other optimal angles for the display content when the user holds the mobile device which allow for better readability.

Then, at 208, the dynamic content alignment program 110A, 110B determines whether the display content is able to be displayed as a hologram. The mobile device has holographic capability if the mobile device is configured to project display content in mid-air. A holographic display may project 3D images which can be viewed without 3D glasses. In response to determining the display content is not able to be displayed as a hologram (step 208, "No" branch), the dynamic content alignment process 200 proceeds to step 210 to align the display content as text. In response to determining the display content is able to be displayed as a hologram (step 208, "Yes" branch), the dynamic content alignment process 200 proceeds to step 214 to analyze the length of the display content.

Figure 4:
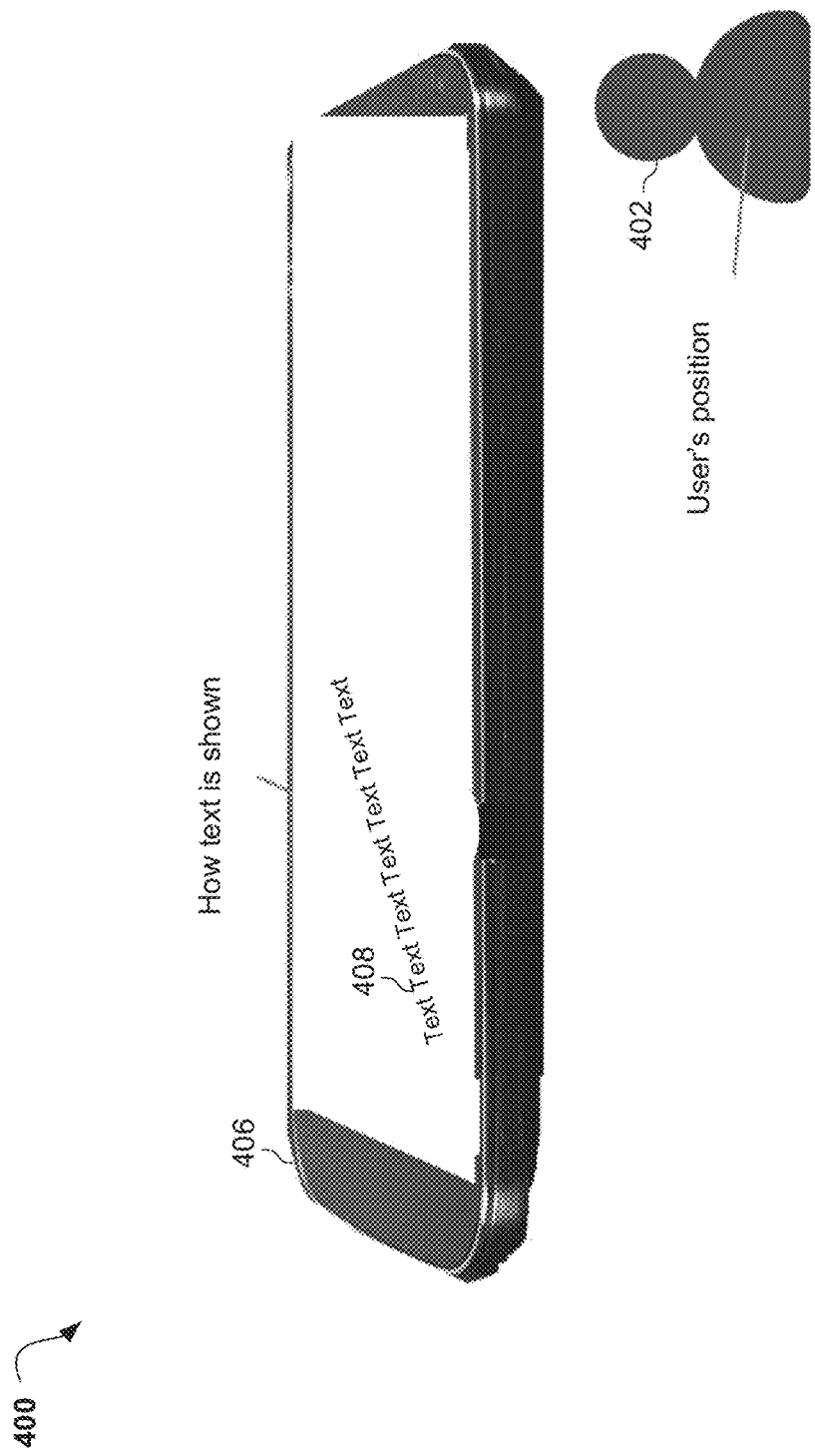
FIG. 4 is an example diagram depicting a display of text on the display surface of the mobile device in FIG. 3 according to at least one embodiment.

Next, at 210, the dynamic content alignment program 110A, 110B aligns the display content as text. The alignment is based on the optimal viewing angle. As shown in FIG. 4, the display content may be aligned as text without projecting any display content as a hologram. For example, the text may be aligned diagonally from a top corner of the mobile device to an opposite bottom corner of the mobile device, as described above with respect to step 206.

Then, at 212, the dynamic content alignment program 110A, 110B presents the aligned display content as text to the user. The aligned display content may be presented to the user on the display surface of the mobile device. Depending on the proximity of the user to the mobile device, the aligned display content may increase in size (e.g., if the user is farther away from the mobile device), or the aligned display content may decrease in size (e.g., if the user is closer to the mobile device).

Next, at 214, the dynamic content alignment program 110A, 110B analyzes the length of the display content. The length of the display content may be analyzed using known techniques, such as computer vision techniques and/or natural language processing (NLP) to identify and scan text. The length of the text may be analyzed when the user browses the web, gets a push notification from an application installed on the mobile device, views an email or text message, and/or any time the display screen of the mobile device is active and displaying text.

Then, at 216, the dynamic content alignment program 110A, 110B determines whether the display content is able to fit within the display surface. The determination is made based on the analyzed length of the display content described above with respect to step 214 and a current zoom level of the mobile device. Mobile devices, such as smartphones and tables, have a feature where the user can pinch their fingers together on the display surface to zoom out on the display content and spread their fingers apart on the display screen to zoom in on the display content. For example, the display content may be a series of sentences on a web page and when the user zooms in on the web page, some of the displayed text may disappear (i.e., not fit within the display surface). Continuing the example, the user may zoom out on the web page in which case more of the displayed text may appear (i.e., fit within the display surface). In response to determining the display content is able to fit within the display surface (step 216, "Yes" branch), the dynamic content alignment process 200 proceeds back to step 210 to align the display content as text. In response to determining the display content is not able to fit within the display surface (step 216, "No" branch), the dynamic content alignment process 200 proceeds to step 218 to align the display content as text and a hologram.

Next, at 218, the dynamic content alignment program 110A, 110B aligns the display content as text and the hologram. Similar to step 210, the alignment is based on the optimal viewing angle. As shown in FIG. 3, the display content may be aligned as a hybrid of text and a hologram. For example, as shown in FIG. 3, the hologram may be aligned diagonally from a top corner of the mobile device to a center of the display surface, and then the remaining display content may be aligned as text from the center of the display surface to an opposite bottom corner of the mobile device. This example is not intended to be limiting, and the hybrid of text and the hologram may be aligned in a different order. For example, the text may be aligned diagonally from a top corner of the mobile device to a center of the display surface, and then the remaining display content may be aligned as the hologram from the center of the display surface to an opposite bottom corner of the mobile device.

Then, at 220, the dynamic content alignment program 110A, 110B presents the aligned display content as text and the hologram to the user. Similar to step 212, the aligned display content may be presented to the user on the display surface of the mobile device, and the size of the display content may be adjusted based on the proximity of the user to the mobile device.

According to at least one embodiment, the hologram may be presented to the user via the display surface of the mobile device in a curved configuration. The curvature of the hologram presented to the user may be adjusted based on a confidentiality level of the display content. For example, as described above with respect to step 214, the user may browse the web, get a push notification from an application installed on the mobile device, or view an email or text message. Continuing the example, browsing the web may have a low confidentiality level, getting a push notification may have a higher confidentiality level, and viewing an email or text message may have the highest confidentiality level. Therefore, the hologram associated with the web content may have little to no curvature, the hologram associated with the push notification may have a greater curvature, and the hologram associated with the email or text message may have the greatest curvature.

According to at least one other embodiment, a brightness and contrast of the hologram presented to the user via the display surface of the mobile device may be adjusted based on the environmental surroundings of the user. For example, if it is dark in a room where the user is viewing the display content on the mobile device, the hologram may become brighter and the contrast between light and dark areas of the display content may be increased. The brightness and contrast of the hologram may also be adjusted based on the available power in the mobile device. For example, if the battery level of the mobile device falls below 50%, the hologram may become darker and the contrast may be decreased.

Figure 3:
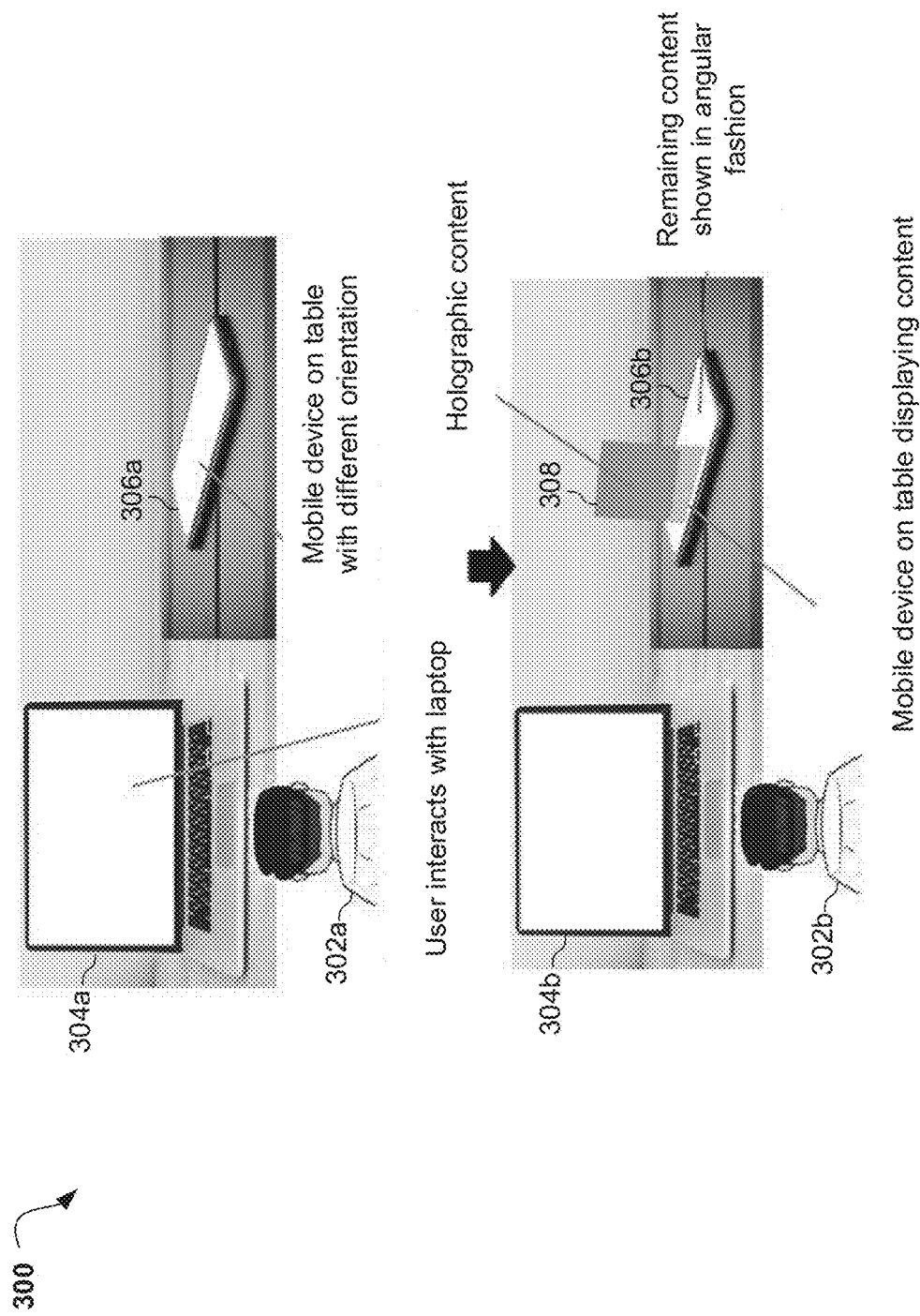
FIG. 3 is a diagram depicting a reference device, a mobile device, and a hologram displayed by the mobile device according to at least one embodiment.

Referring now to FIG. 3, a diagram 300 depicting a reference device, a mobile device, and a hologram displayed by the mobile device is shown according to at least one embodiment. In the diagram 300, the user 302a may be interacting with the reference device 304a. For example, the user 302a may be typing on the reference device 304a. Prior to displaying the display content, the mobile device 306*a* may be positioned to the right of the reference device 304*a* and the display surface of the mobile device 306*a* may be oriented at an angle of 45° toward a keyboard of the reference device 304*a*, and thus at an angle of 45° from the viewing direction of the user 302*a*. Upon receiving a notification (i.e., display content), the mobile device 306*b* may identify its position and orientation with respect to the reference device 304*b* and may present a portion of the display content to the user 302*b* in the form of a hologram 308 and the remaining display content as text, as shown in FIG. 4. As described above with respect to FIG. 2, the hologram 308 may be aligned diagonally from a top corner of the mobile device 306*b* to a center of the display surface, and then the remaining display content may be aligned as text from the center of the display surface to an opposite bottom corner of the mobile device 306*b*. Therefore, regardless of the orientation of the display surface of the mobile device 306*b* and the position of the mobile device 306*b* relative to the reference device 304*b* and to the user 302*b*, the display content may be aligned in accordance with the optimal viewing angle of the display content.

Referring now to FIG. 4, a diagram 400 depicting a display of text on the display surface of the mobile device in FIG. 3 is shown according to at least one embodiment. In the diagram 400, the user 402 may be positioned such that the mobile device 406 is positioned to the left of the user 402 and the display surface of the mobile device 406 may be oriented perpendicular to the viewing direction of the user 402. As shown in the diagram 400 and as described above with respect to FIG. 2, the text 408 may be aligned diagonally and presented to the user 402 from a top left corner of the mobile device 406 to a bottom right corner of the mobile device. In the embodiment described in FIG. 4, the display content is able to fit within the display surface of the mobile device 406 and may therefore be aligned and presented to the user 402 as text 408.

It may be appreciated that FIGS. 2-4 provide only an illustration of one implementation and do not imply any limitations with regard to how different embodiments may be implemented. Many modifications to the depicted environments may be made based on design and implementation requirements.

Figure 5:
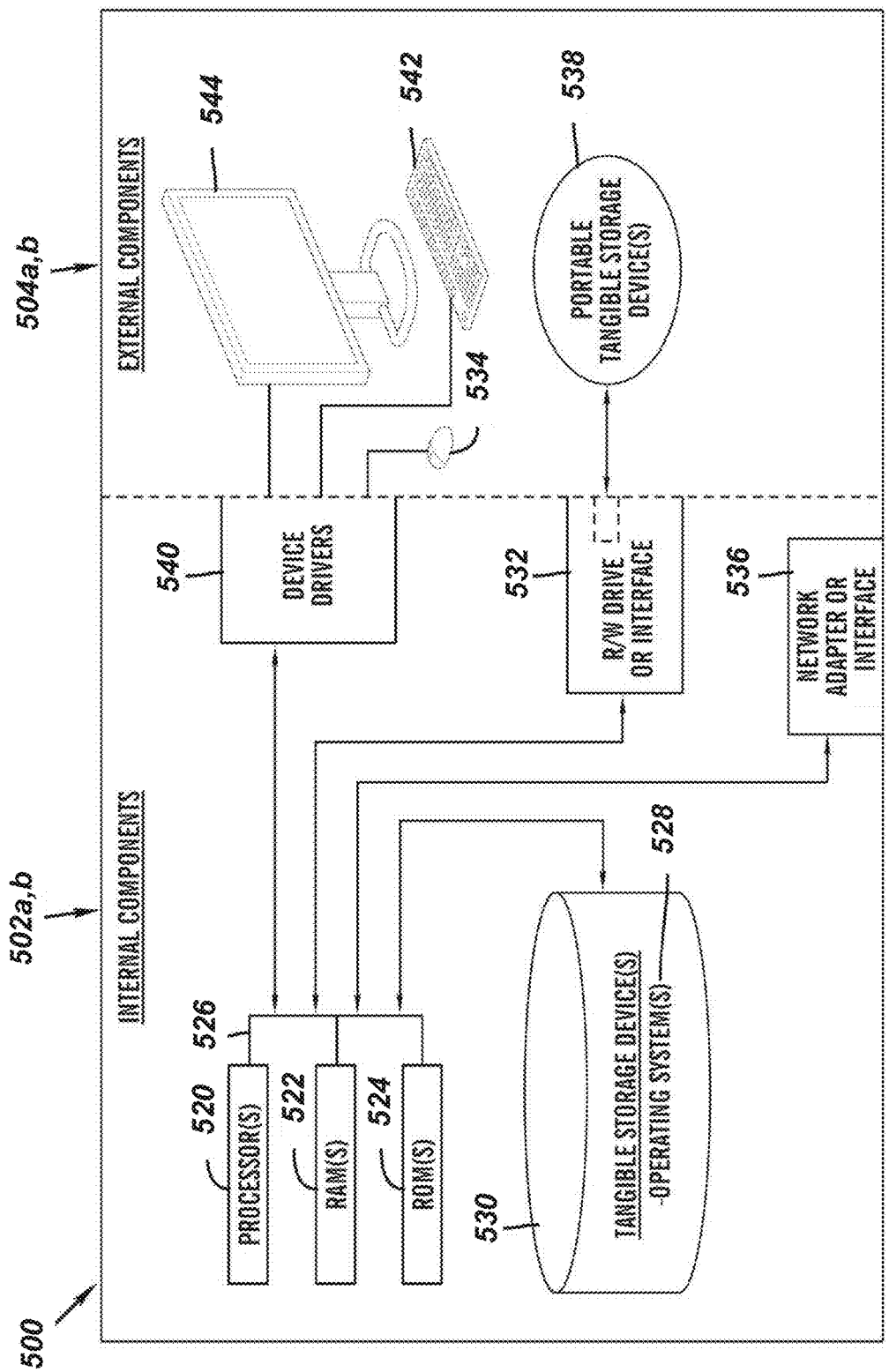
FIG. 5 is a functional block diagram of internal and external components of computers and servers depicted in FIG. 1 according to at least one embodiment.

FIG. 5 is a block diagram 500 of internal and external components of the client computing device 102 and the server 112 depicted in FIG. 1 in accordance with an embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

The data processing system 502, 504 is representative of any electronic device capable of executing machine-readable program instructions. The data processing system 502, 504 may be representative of a smart phone, a computer system, PDA, or other electronic devices. Examples of computing systems, environments, and/or configurations that may represented by the data processing system 502, 504 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 502 *a,b* and external components 504 *a,b* illustrated in FIG. 5. Each of the sets of internal components 502 include one or more processors 520, one or more computer-readable RAMs 522, and one or more computer-readable ROMs 524 on one or more buses 526, and one or more operating systems 528 and one or more computer-readable tangible storage devices 530. The one or more operating systems 528, the software program 108 and the dynamic content alignment program 110A in the client computing device 102 and the dynamic content alignment program 110B in the server 112 are stored on one or more of the respective computer-readable tangible storage devices 530 for execution by one or more of the respective processors 520 via one or more of the respective RAMs 522 (which typically include cache memory). In the embodiment illustrated in FIG. 5, each of the computer-readable tangible storage devices 530 is a magnetic disk storage device of an internal hard drive. Alternatively, each of the computer-readable tangible storage devices 530 is a semiconductor storage device such as ROM 524, EPROM, flash memory or any other computer-readable tangible storage device that can store a computer program and digital information.

Each set of internal components 502 *a,b* also includes a R/W drive or interface 532 to read from and write to one or more portable computer-readable tangible storage devices 538 such as a CD-ROM, DVD, memory stick, magnetic tape, magnetic disk, optical disk or semiconductor storage device. A software program, such as the dynamic content alignment program 110A, 110B, can be stored on one or more of the respective portable computer-readable tangible storage devices 538, read via the respective R/W drive or interface 532, and loaded into the respective hard drive 530.

Each set of internal components 502 *a,b* also includes network adapters or interfaces 536 such as a TCP/IP adapter cards, wireless Wi-Fi interface cards, or 3G or 4G wireless interface cards or other wired or wireless communication links. The software program 108 and the dynamic content alignment program 110A in the client computing device 102 and the dynamic content alignment program 110B in the server 112 can be downloaded to the client computing device 102 and the server 112 from an external computer via a network (for example, the Internet, a local area network or other, wide area network) and respective network adapters or interfaces 536. From the network adapters or interfaces 536, the software program 108 and the dynamic content alignment program 110A in the client computing device 102 and the dynamic content alignment program 110B in the server 112 are loaded into the respective hard drive 530. The network may comprise copper wires, optical fibers, wireless transmission, routers, firewalls, switches, gateway computers and/or edge servers.

Each of the sets of external components 504 *a,b* can include a computer display monitor 544, a keyboard 542, and a computer mouse 534. External components 504 *a,b* can also include touch screens, virtual keyboards, touch pads, pointing devices, and other human interface devices. Each of the sets of internal components 502 *a,b* also includes device drivers 540 to interface to computer display monitor 544, keyboard 542, and computer mouse 534. The device drivers 540, R/W drive or interface 532, and network adapter or interface 536 comprise hardware and software (stored in storage device 530 and/or ROM 524).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
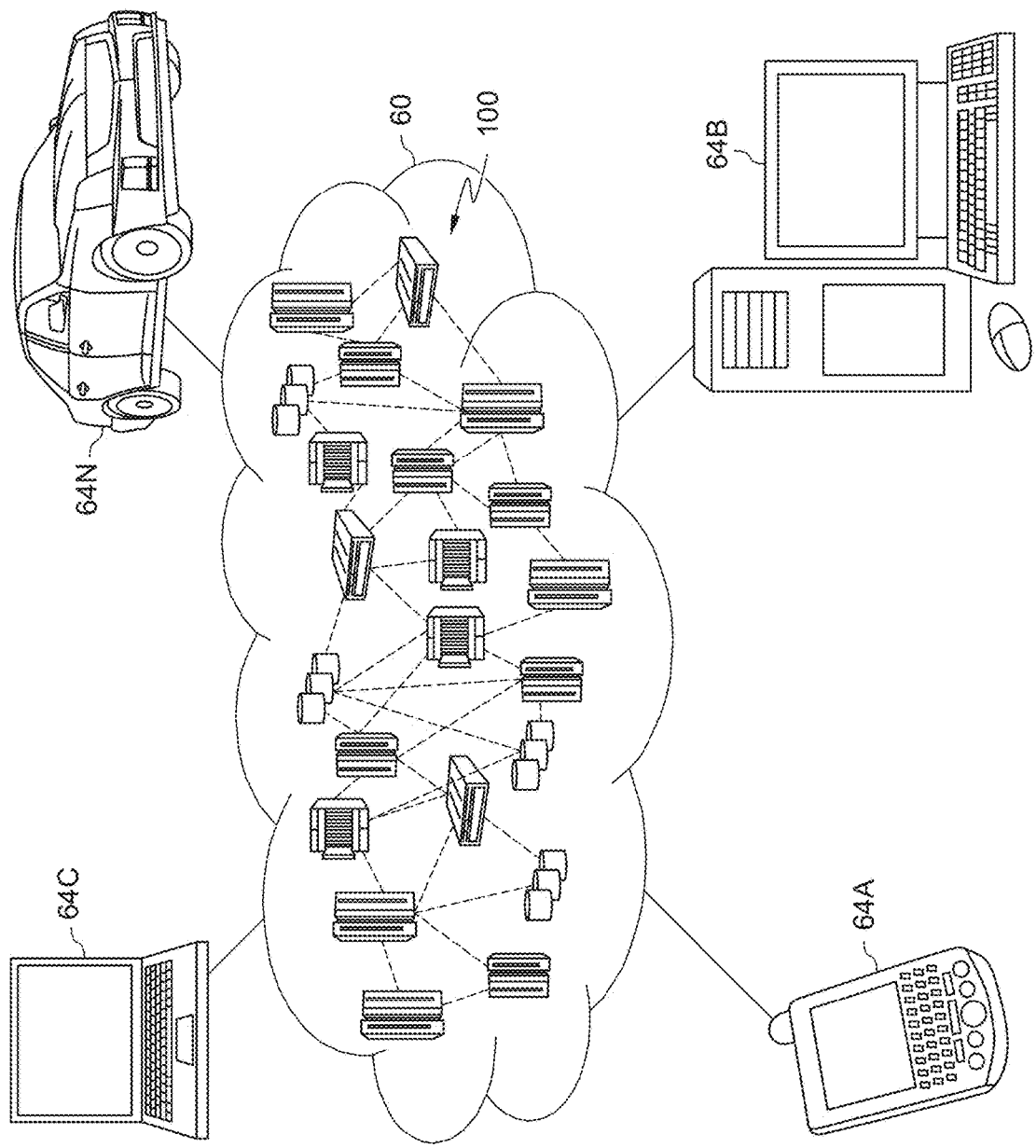
FIG. 6 depicts a cloud computing environment according to an embodiment of the present invention.

Referring now to FIG. 6, illustrative cloud computing environment 60 is depicted. As shown, cloud computing environment 60 comprises one or more cloud computing nodes 100 with which local computing devices used by cloud consumers, such as, for example, personal digital assistant (PDA) or cellular telephone 64A, desktop computer 64B, laptop computer 64C, and/or automobile computer system 64N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 60 to offer infrastructure, platforms and/or software as services for which a cloud consumer does not need to maintain resources on a local computing device. It is understood that the types of computing devices 64A-N shown in FIG. 6 are intended to be illustrative only and that computing nodes 100 and cloud computing environment 60 can communicate with any type of computerized device over any type of network and/or network addressable connection (e.g., using a web browser).

Figure 7:
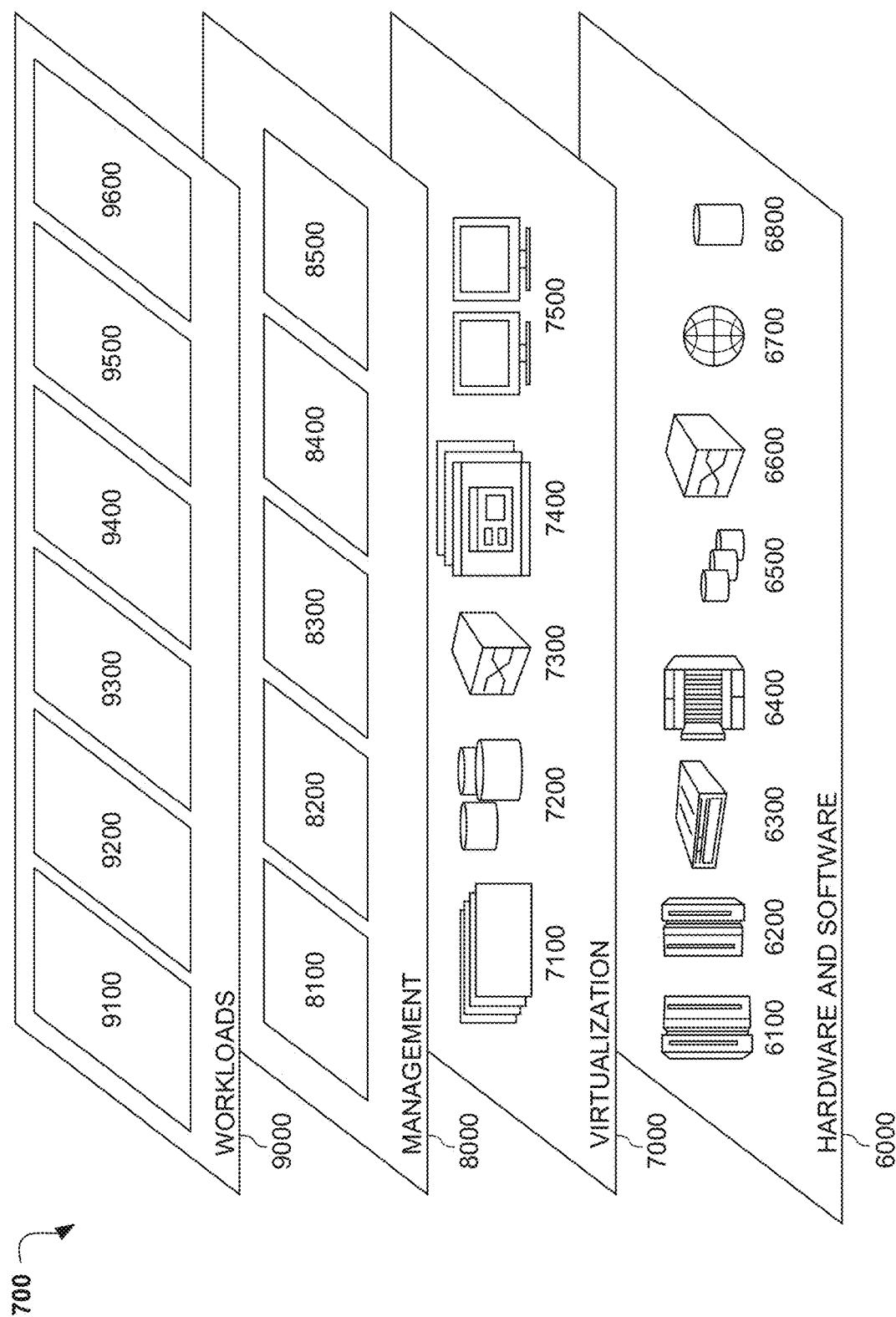
FIG. 7 depicts abstraction model layers according to an embodiment of the present invention.

Referring now to FIG. 7, a set of functional abstraction layers 700 provided by cloud computing environment 60 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 6000 includes hardware and software components. Examples of hardware components include: mainframes 6100; RISC (Reduced Instruction Set Computer) architecture based servers 6200; servers 6300; blade servers 6400; storage devices 6500; and networks and networking components 6600. In some embodiments, software components include network application server software 6700 and database software 6800.

Virtualization layer 7000 provides an abstraction layer from which the following examples of virtual entities may be provided: virtual servers 7100; virtual storage 7200; virtual networks 7300, including virtual private networks; virtual applications and operating systems 7400; and virtual clients 7500.

In one example, management layer 8000 may provide the functions described below. Resource provisioning 8100 provides dynamic procurement of computing resources and other resources that are utilized to perform tasks within the cloud computing environment. Metering and Pricing 8200 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 8300 provides access to the cloud computing environment for consumers and system administrators. Service level management 8400 provides cloud computing resource allocation and management such that required service levels are met. Service Level Agreement (SLA) planning and fulfillment 8500 provide pre-arrangement for, and procurement of, cloud computing resources for which a future requirement is anticipated in accordance with an SLA.

Workloads layer 9000 provides examples of functionality for which the cloud computing environment may be utilized. Examples of workloads and functions which may be provided from this layer include: mapping and navigation 9100; software development and lifecycle management 9200; virtual classroom education delivery 9300; data analytics processing 9400; transaction processing 9500; and dynamically aligning content displayed on a mobile device based on an orientation of a display surface of the device relative to a viewing direction of a user 9600. Dynamically aligning content displayed on a mobile device based on an orientation of a display surface of the device relative to a viewing direction of a user 9600 may relate to identifying an optimal viewing angle of content displayed on a display surface of a mobile device based on an orientation of the display surface and a position of the mobile device relative to a viewing direction of the user in order to align the display content as text and/or a hologram based on the optimal viewing angle.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of dynamically aligning content displayed on a mobile device, the method comprising:
   receiving data relating to a position and orientation of a reference device relative to a user;
   identifying an orientation of a display surface of a mobile device and a relative position of the mobile device relative to a viewing direction of the user based on the position and orientation of the reference device;
   identifying an optimal viewing angle of display content on the display surface of the mobile device based on the orientation of the display surface and the position of the mobile device relative to the viewing direction of the user;
   determining whether the display content is able to be displayed as a hologram;
   in response to determining the display content is not able to be displayed as the hologram, aligning the display content as text based on the optimal viewing angle;
   presenting the aligned display content as the text to the user;
   in response to determining the display content is able to be displayed as the hologram, analyzing a length of the display content; and
   determining whether the display content is able to fit within the display surface based on the analyzed length of the display content and a real-time zoom level of the mobile device.

2. The method of claim 1, further comprising:
   in response to determining the display content is able to fit within the display surface, aligning the display content as the text based on the optimal viewing angle; and
   presenting the aligned display content as the text to the user.

3. The method of claim 2, further comprising:
   in response to determining the display content is not able to fit within the display surface, aligning the display content as the text and the hologram based on the optimal viewing angle; and
   presenting the aligned display content as the text and the hologram to the user.

4. The method of claim 3, wherein a plurality of proximity and sonic wave sensors embedded in the mobile device are utilized to identify the orientation of the display surface of the mobile device and the relative position of the mobile device relative to the viewing direction of the user.

5. The method of claim 3, wherein a curvature of the hologram presented to the user is adjusted based on a confidentiality level of the display content.

6. The method of claim 3, wherein a brightness and contrast of the hologram presented to the user is adjusted based on surroundings of the user and available power in the mobile device.

7. A computer system, the computer system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   receiving data relating to a position and orientation of a reference device relative to a user;
   identifying an orientation of a display surface of a mobile device and a relative position of the mobile device relative to a viewing direction of the user based on the position and orientation of the reference device;
   identifying an optimal viewing angle of display content on the display surface of the mobile device based on the orientation of the display surface and the position of the mobile device relative to the viewing direction of the user;
   determining whether the display content is able to be displayed as a hologram;

in response to determining the display content is not able to be displayed as the hologram, aligning the display content as text based on the optimal viewing angle;

presenting the aligned display content as the text to the user;

in response to determining the display content is able to be displayed as the hologram, analyzing a length of the display content; and determining whether the display content is able to fit within the display surface based on the analyzed length of the display content and a real-time zoom level of the mobile device.

8. The computer system of claim 7, further comprising:

in response to determining the display content is able to fit within the display surface, aligning the display content as the text based on the optimal viewing angle; and presenting the aligned display content as the text to the user.

9. The computer system of claim 8, further comprising:

in response to determining the display content is not able to fit within the display surface, aligning the display content as the text and the hologram based on the optimal viewing angle; and presenting the aligned display content as the text and the hologram to the user.

10. The computer system of claim 9, wherein a plurality of proximity and sonic wave sensors embedded in the mobile device are utilized to identify the orientation of the display surface of the mobile device and the relative position of the mobile device relative to the viewing direction of the user.

11. The computer system of claim 9, wherein a curvature of the hologram presented to the user is adjusted based on a confidentiality level of the display content.

12. The computer system of claim 9, wherein a brightness and contrast of the hologram presented to the user is adjusted based on surroundings of the user and available power in the mobile device.

13. A computer program product, the computer program product comprising:

one or more computer-readable tangible storage medium and program instructions stored on at least one of the one or more tangible storage medium, the program instructions executable by a processor capable of performing a method, the method comprising:

receiving data relating to a position and orientation of a reference device relative to a user;

identifying an orientation of a display surface of a mobile device and a relative position of the mobile device relative to a viewing direction of the user based on the position and orientation of the reference device;

identifying an optimal viewing angle of display content on the display surface of the mobile device based on the orientation of the display surface and the position of the mobile device relative to the viewing direction of the user;

determining whether the display content is able to be displayed as a hologram;

in response to determining the display content is not able to be displayed as the hologram, aligning the display content as text based on the optimal viewing angle;

presenting the aligned display content as the text to the user;

in response to determining the display content is able to be displayed as the hologram, analyzing a length of the display content; and determining whether the display content is able to fit within the display surface based on the analyzed length of the display content and a real-time zoom level of the mobile device.

14. The computer program product of claim 13, further comprising:

in response to determining the display content is able to fit within the display surface, aligning the display content as the text based on the optimal viewing angle; and presenting the aligned display content as the text to the user.

15. The computer program product of claim 14, further comprising:

in response to determining the display content is not able to fit within the display surface, aligning the display content as the text and the hologram based on the optimal viewing angle; and presenting the aligned display content as the text and the hologram to the user.

16. The computer program product of claim 15, wherein a plurality of proximity and sonic wave sensors embedded in the mobile device are utilized to identify the orientation of the display surface of the mobile device and the relative position of the mobile device relative to the viewing direction of the user.

17. The computer program product of claim 15, wherein a curvature of the hologram presented to the user is adjusted based on a confidentiality level of the display content.

* * * * *